United States Patent [19]

Beck

[11] Patent Number: 5,632,700
[45] Date of Patent: *May 27, 1997

[54] ADJUSTABLE ENDLESS BELT FOR USE IN POWER TRANSMISSION

[76] Inventor: Paul Beck, 21660 Pacific Coast Hwy., Malibu, Calif. 90265

[*] Notice: The term of this patent shall not extend beyond the expiration date of Pat. No. 5,484,342.

[21] Appl. No.: 574,845

[22] Filed: Dec. 19, 1995

Related U.S. Application Data

[63] Continuation of Ser. No. 349,019, Dec. 2, 1994, Pat. No. 5,484,342.

[51] Int. Cl.⁶ .................................................. F16G 3/10
[52] U.S. Cl. ........................ 474/254; 474/256; 156/502
[58] Field of Search ............................. 474/242, 253, 474/254, 256; 156/198, 218, 502, 506, 509

[56] References Cited

U.S. PATENT DOCUMENTS

| | | | |
|---|---|---|---|
| Re. 33,389 | 10/1990 | Beck | 474/253 |
| 2,182,169 | 12/1939 | Bierer | 474/254 |
| 3,783,704 | 1/1974 | Lawson | 474/254 |
| 4,010,655 | 3/1977 | Pollard | 474/254 |
| 4,031,766 | 6/1977 | Beck | 474/254 |
| 4,637,810 | 1/1987 | Beck | 474/253 |

*Primary Examiner*—Roger J. Schoeppel
*Attorney, Agent, or Firm*—Lyon & Lyon

[57] ABSTRACT

An endless belt particularly adapted for use in high speed power transmission, commonly termed a fan belt, which is particularly adopted to be readily formed on site to any desired length and methods and apparatus for forming the belt. The belt is comprised of an outer length of flexible and durable polymeric material having a longitudinally channel extending therethrough spaced closer to the inner surface of said belt than the outer surface thereof and a reinforcing ribbon of a flexible and durable material inserted into the channel within the outer length of material through a radial slit extending from the outer surface of the outer length of material to the longitudinal channel therein. A portion of the reinforcing ribbon within said channel extends across the abutting ends of the outer length of material and overlaps a second portion of the ribbon within the channel and is bonded thereto by an adhesive. The overlapping portions of the ribbon within the outer length of material span at least one-quarter and more preferably one-half of the circumference of the belt, and maintain the structural integrity of the belt.

6 Claims, 5 Drawing Sheets

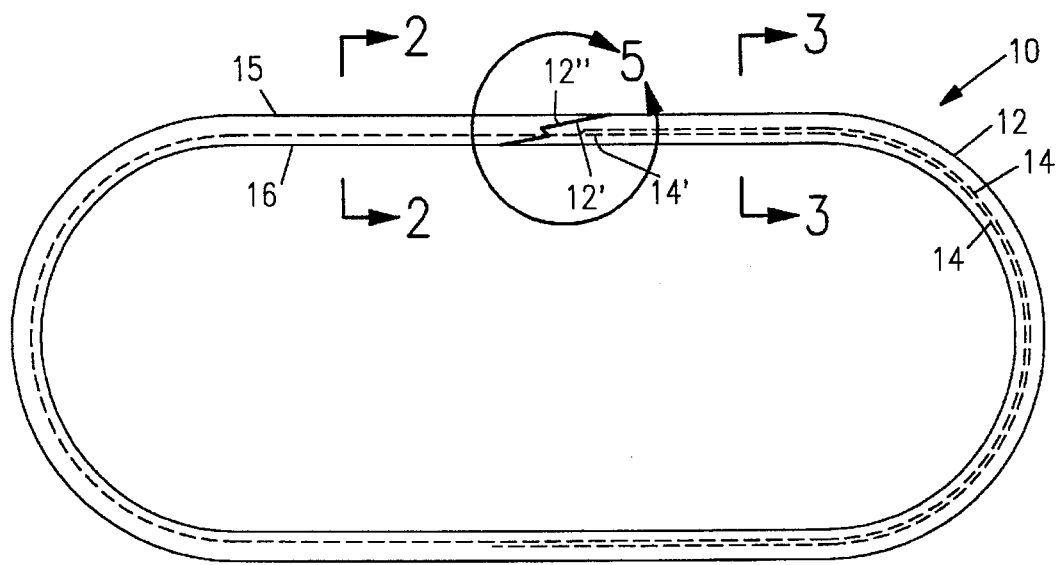
*fig.1*
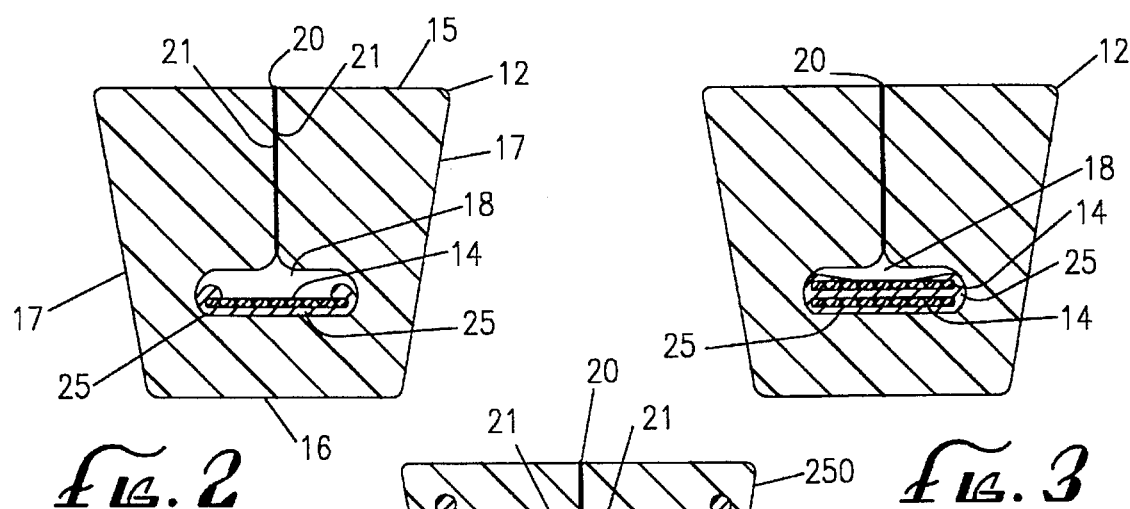
*fig.2*   *fig.3*
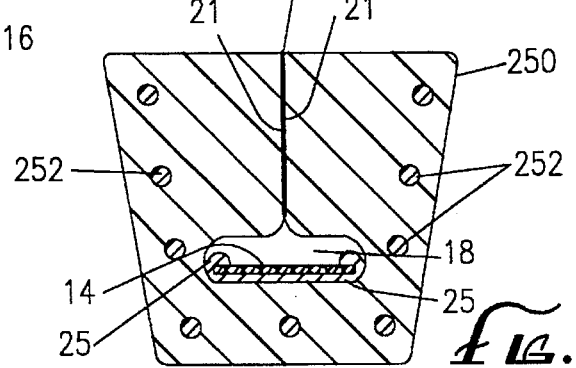
*fig.4*
*fig.5*

ADJUSTABLE ENDLESS BELT FOR USE IN POWER TRANSMISSION

This is a continuation of application Ser. No. 08/349,019 filed on Dec. 2, 1994, now U.S. Pat. No. 5,484,342.

BACKGROUND OF THE INVENTION

The endless belts used for moderate load power transmission application in automobiles, which are more commonly collectively termed fan belts, are constructed of a flexible, tear-resistant polymeric material and are manufactured in countless different sizes to accommodate the varying pulley sizes and spacings therebetween found in the vast number of different models of automobiles sold and driven in the United States and foreign countries. While these endless belts are quite durable, they nevertheless are subjected to a great deal of stress due to their high speed operation and consequently must be periodically replaced. Thus, for a garage to be able to meet the needs of its customers, it is necessary to stock a large number of differently sized belts. This presents a substantial inventory problem to the garage as these belts are of a fixed size and consequently a belt suitable for one make of automobile cannot generally be used in another unless the size requirements are the same. Unfortunately, this is not generally the case.

In addition to having to stock a large inventory of these belts, a garage mechanic must often expend a good deal of labor in securing the belt about the pulleys due to the limited flexibility inherent in such belts and the often encountered awkward positioning of the pulleys with respect to the automobile body presenting the mechanic with restricted access for mounting the belt on the pulleys.

The problems of fixed belt size and installation could be greatly relieved if the belt were either adjustable or of a construction whereby it could be readily assembled on site to the desired size for a particular application, e.g. in an auto repair garage by an auto repair person for a particular model of automobile. One solution to the problems of fixed belt size and installation is found in applicant's U.S. Pat. No. 4,031,766 wherein an adjustable belt is provided which can be assembled about the pulleys and thereby facilitate installation while obviating the need for an inventory of differently sized belts. That solution employs a belt having a male end of reduced diameter and a female end having a channel therein equal in length to the reduced diameter portion of the male end. To define a belt having the desired size, equal precalculated lengths are severed from both the male and female ends, and an adhesive is applied about the male end which is then inserted into the female end of the belt. To avoid any gaps which would otherwise weaken and imbalance the belt, these cuttings have to be carefully made to insure that the length of the reduced diameter portion of the male end is equal to the length of the channel in the female end.

An improvement to the above-described patented belt configuration is disclosed in applicant's U.S. Pat. No. Re. 33,389. In the improved structure, an outer length of flexible and durable belt material is provided with a centrally disposed channel extending therethrough and a flexible and durable cord is slidably disposed within the channel and extends the length thereof. An endless belt of the desired size is formed by cutting the length of belt material with the reinforcing cord contained therein to the desired length, pulling a portion of the cord from one end of the outer length of belt material and applying an adhesive to the exposed cord and the ends of the belt material. The exposed portion of the reinforcing cord is then inserted into the open channel in the other end of the outer length of belt material until the ends of the outer length of material are in an abutting relationship. As the reinforcing cord is of the same length as the outer length of material, the ends of the reinforcing cord will also be in an abutting relationship within the outer length of material. Upon setting of the adhesive, a durable endless belt of the desired size is formed. While such a belt construction and forming process retains the ease of installation and adjustability of the earlier patented construction, it eliminates the need for having to make to precise cuts during the belt forming process and provides the resultant belt with superior strength characteristics. However, it has been found that such a construction is relatively expensive due to the costs of forming a cylindrical longitudinal channel in the outer belt length. It would therefore be highly desirable to provide an endless belt forming process having these same improved characteristics but which reduces the cost of construction. The endless belt and forming processes disclosed herein achieve these results.

SUMMARY OF THE INVENTION

Briefly, the present invention relates to an endless belt for power transmission and methods and apparatus for readily forming the belt on site in any desired length. The belt of the present invention is comprised of an outer length of flexible, tear-resistant belt material defining parallel inner and outer surfaces and formed into a closed loop of a desired size. The outer length of belt material has a generally rectangular interior channel therein extending about the formed loop proximate the inner surface thereof. A reinforcing ribbon of a tear-resistant, flexible material is disposed within the channel and extends about the loop, traversing the abutting ends of the outer length of belt material and overlapping itself within the interior channel throughout about fifty percent of the formed loop. An adhesive is provided within the interior channel for securing the reinforcing ribbon therein to the interior of the outer length of belt material and for securing together the overlapping portions of the reinforcing ribbon within the channel, thereby providing an exceptionally strong and highly durable power transmission belt.

The endless belt of the present invention is particularly adapted to be formed on site into any desired length either manually or automatically with a belt-forming apparatus. This is achieved by providing the outer length of belt material with a longitudinally extending radial slit in the outer surface of the length of belt material which communicates with the interiorly disposed channel. The outer length of belt material is first cut to the desired length such that the extended ends thereof define acutely angled mating surfaces. In the preferred process for forming the belt, the adhesive and reinforcing ribbon are concurrently fed into the interior channel in the outer length of belt material through the radial slit therein as the outer length of belt material is formed into a closed loop. The ribbon and adhesive continue to be fed into the channel after the leading end of the outer length of belt material is brought into abutment with the trailing end to form the endless loop such that the reinforcing ribbon extends across the abutting ends of the belt material and extends longitudinally about and within the outer length of material as above described. The ribbon is then severed such that a short length thereof projects radially from the interior channel through the slit in the belt material. The protruding ribbon is then pressed into the channel through the slit whereupon the abutting ends of belt material are clamped together in a matting relationship as the adhesive quickly sets, completing the belt forming process.

It is the principal object of the present invention to provide an endless belt for power transmission which can be readily formed into any desired length and which is very durable and economical to manufacture.

It is another object of the present invention to provide improved methods and apparatus which can be readily employed on site to form a very durable endless belt for power transmission in any desired length.

Other objects and advantages of the present invention will become readily apparent from the following detailed description taken in conjunction with the accompanying drawings.

DESCRIPTION OF THE PREFERRED EMBODIMENTS

In the drawings

FIG. 1 is a side view of the endless belt of the present invention.

FIG. 2 is a sectional view taken along the line 2—2 of FIG. 1.

FIG. 3 is a sectional view taken along the line 3—3 of FIG. 1.

FIG. 4 is a sectional view of an alternate embodiment of the endless belt of the present invention.

FIG. 5 is an enlarged partial side view of the joined abutting ends of material forming the endless belt of the present invention.

Figure 6:
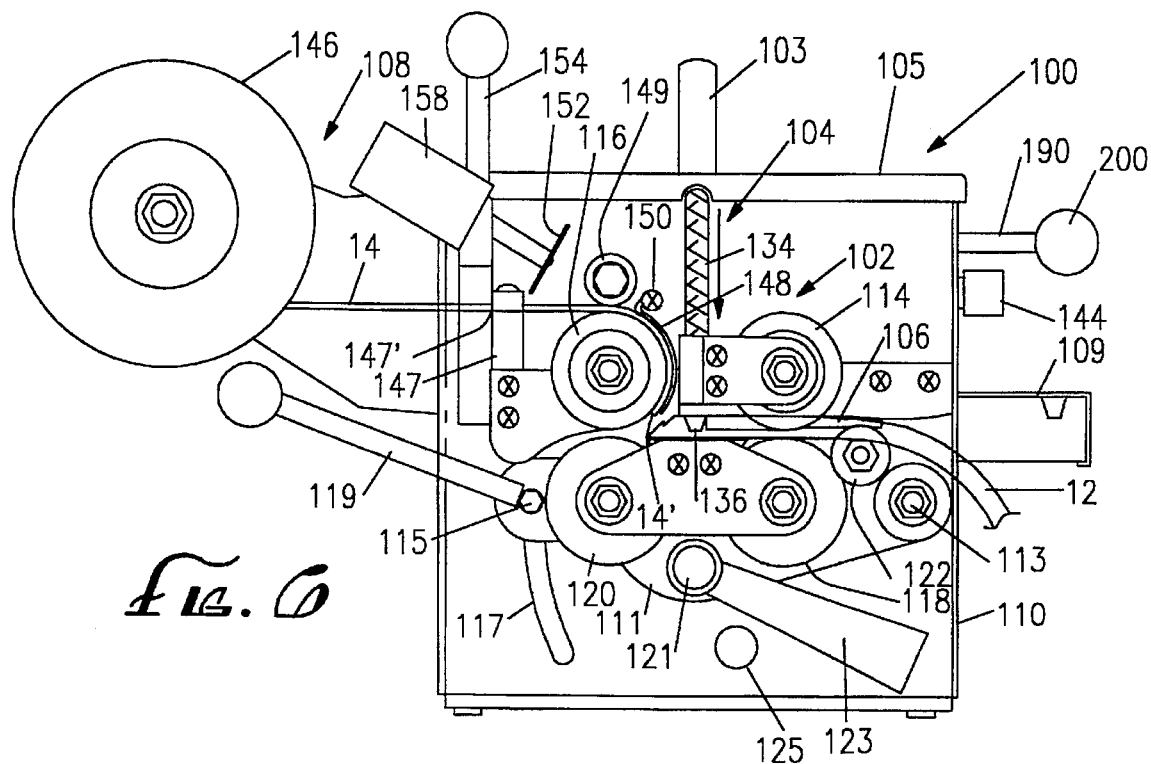
FIGS. 6–11 are side views of a belt forming apparatus of the present invention illustrating the sequential steps of forming the belt with the apparatus. Portions of the outer length of belt material are illustrated therein as though the material were transparent for clarity and so as not to obstruct the view of the elements projecting into the belt material during formation of the endless belt.

Referring now in detail to the drawings, the endless belt 10 of the present invention is comprised of an outer length of flexible tear-resistant belt material 12 and a length of reinforcing ribbon 14. The outer belt material is preferably formed of an extruded semi-rigid polymeric material such as a thermoplastic polyurethane having no added slip or release agents which would inhibit bondability. A polyether-based material marketed by B.F. Goodrich Company under the designation Estane 58212 has proved highly suitable for use in forming the outer belt length 12. The reinforcing ribbon 14 is preferably formed of kevlar or a polyester material. A ribbon of woven cotton or other non-stretchable fibers could also be employed. The outer length of belt material 12 defines parallel outer and inner surfaces 15 and 16, oppositely inclined sidewalls 17 and has a longitudinal generally rectangular channel 18 extending therethrough. To prevent the belt from inverting during formation or use, channel 18 is spaced within the outer length 12 closer to the inner surface 16 thereof than the outer surface 14. Preferably, the upper end of channel 18 is disposed about midway between surfaces 15 and 16 so as to at least substantially dispose channel 18 in the inner half of the formed belt as seen in FIGS. 2–4.

A very thin slit 20 is provided in the outer length of material 12 which extends throughout the length thereof perpendicularly from the outer belt surface 15 to channel 18 so that the reinforcing ribbon 14 can be readily inserted therethrough into channel 18 as will be described. The upper surface of channel 18 is preferably radiused adjacent slit 20 to provide additional space in the upper portion of channel 18 to accommodate an adhesive for securement of the reinforcing ribbon therein and to facilitate entry of the reinforcing ribbon into the channel 18 through slit 20. Slit 20 is formed so that the adjacent vertical wall portions 21 about slit 20 are preferably in an abutting disposition with no air gap therebetween.

The reinforcing ribbon 14 is preferably of a rectangular configuration in cross section and sized such that the transverse dimension thereof is slightly less than the transverse dimension of channel 18 and the thickness or height thereof is slightly less than one-half the height of channel 18 so that portions of ribbon 14 can be disposed in an overlapping disposition within channel 18 with an adhesive disposed thereover without distorting either the reinforcing ribbon 14 or the outer length of material 12. By way of example, in a belt 10 wherein the outer surface 15 is about 0.460 inches wide, the inner surface 16 is about 0.260 inches wide and having a height of about 0.325 inches, a ribbon about 3/16 of an inch wide and about 0.100 to 0.110 inches in thickness is disposed in a channel 18 measuring about 0.190 inches wide by about 0.075 in. high. The bottom surface of channel 18 is spaced about 0.090 inches from inner surface 16. The end walls forming channel 18 can be slightly rounded as shown in FIGS. 2–4 to avoid the formation of sharp corners within the belt and thus avoid possible stress risers within the belt. With certain ribbon materials such as kevlar, it is also desirable to round the corners thereof as seen in FIGS. 2–4 so that the ribbon will not cut into the outer length of belt material 12.

In belt 10, the outer length of belt material 12 forms a closed loop of any desired size with the extended ends 12' and 12" being in an abutting and mating relationship. Ends 12' and 12" preferably define acute angles with respect to the central axis of belt length 12 and are of a "zigzag" configuration, as illustrated in FIG. 5, to provide both a large area of surface contact between the abutting ends and a mechanical interlock therebetween. The reinforcing ribbon 14 is disposed in a flat disposition in a relatively thin bed of a quick setting adhesive adjacent the bottom wall of channel 18 and extends within channel 18 approximately one and one-half times about the interior of belt 10. Thus that the ribbon extends across the abutting ends 12' and 12" of the outer length of belt material 12 and a substantial portion of the reinforcing ribbon is in an overlapping disposition within channel 18. The adhesive is injected into channel 18 during the formation of the belt to secure the reinforcing ribbon both to itself along the overlapping portions thereof and to the outer length of belt material 12. A small amount of adhesive is also applied to the ends 12' and 12" of belt length 12 to secure together the mating ends 12' and 12" of the outer length of belt material in a smooth and continuous joint. The resultant belt 10 with its interior reinforcement is highly durable, heat resistant and not susceptible to stretching during use. The polyurethane of which the outer portion of the belt is preferably formed has a high coefficient of fiction to reduce slippage during use and is ozone resistant. In addition to providing an improved power transmission belt, belt 10 is particularly adapted to being formed on site as for example by a garage mechanic into any circumferential size for the particular application at hand.

The adhesive 25 employed in belt 10 is preferably a two component urethane adhesive having a resin to accelerator ratio of 1:1 to facilitate application. An adhesive marketed by Ciba-Geigy Corporation of East Lansing, Mich. under the product designation Arathane AW-5540-HW 5542 has been found to be a suitable adhesive for use in belt 10.

The process for forming belt 10 in any desired size can be varied depending on the output needs of the belt former. For example, the outer length of belt material 12 with the interior channel 18 and radial slit 20 formed therein during extrusion can be provided either with the reinforcing ribbon 14 already disposed in channel 18 for manual fabrication or, more preferably, separately from the ribbon for automated fabrication. If provided separately, the outer length of material 12 is first cut to the predetermined length for forming the desired belt size such that the extended ends 12' and 12" define acute mating angles, preferably of a zigzag configuration as previously described. The severed outer length of material 12 is then formed into a continuous endless loop as the reinforcing ribbon 14 and adhesive 25 are concurrently inserted into the channel 18 therein.

As the outer length of belt material 12 is directed about a plurality of guide rollers in the formation of length 12 into a closed loop, the side wall portions 21 of slit 20 are temporarily spaced apart to provide access to channel 18 for the insertion therein of the adhesive 25 and reinforcing ribbon 14. The adhesive and reinforcing ribbon are then fed through the widened slit 20 into the interior channel 18 such that the ribbon lies flat within the channel on a thin layer of adhesive with the leading end of the reinforcing ribbon within channel 18 being proximate the leading end 12' of the outer length of belt material 12. The adhesive and reinforcing ribbon continue to be fed into channel 18 along the length of belt material 12 and as the adhesive and ribbon approach the trailing end 12" of the belt length 12, the leading end 12' thereof is brought into abutment with the trailing end 12" to form a closed loop. The adhesive and ribbon continue to be fed into channel 18 such that the adhesive and reinforcing ribbon extend across the abutting ends 12' and 12" of the outer length of belt material 12 and overlap the previously deposited ribbon within channel 18, as seen in FIG. 3, for a distance slightly less than about one-half of the circumference of formed endless belt. The reinforcing ribbon projecting from the formed loop through slit 20 is then severed, leaving a trailing end portion protruding through slit 20. The trailing end portion is pressed into channel 18 through slit 20 against an intermediate portion of the ribbon. The adjacent belt ends 12' and 12" are slightly separated and a small amount of adhesive is applied to the ends of belt length 12. The ends are pressed together and held in a mating relationship while the adhesive sets, completing the formation of the belt. While the length of the overlapping portions of the ribbon in channel 18 can vary, the overlapping portion should extend at least about one-quarter of the circumference of the formed belt 10 and more preferably about one-half thereof.

In the formed belt 10, the reinforcing ribbon 14 thus extends across the abutting ends of the outer layer of belt material 12 and a substantial portion of the ribbon is bonded together by the adhesive in an overlapping disposition. As the ribbon within channel 18 is in continual contact with the adhesive, the reinforcing ribbon is bonded both to the channel walls within the outer length of belt material and to itself along the overlapping portions thereof, thereby maintaining the formed belt 10 in its endless loop configuration and providing the belt with superior structural integrity and durability. The slit 20 in the outer portion of the outer belt material also can be sealed by the adhesive, if desired, by depositing a small amount of adhesive on slit walls 20 during the belt forming process. However, as the natural resilience of the material of which belt length 12 is formed causes slit walls 21 to return to an abutting disposition after the tool employed to space the walls apart during the adhesive and ribbon feeding steps is removed, slit 20 is not noticeable and thus need not be sealed for aesthetic purposes. As the slit is in the outer portion of belt 10 and as the ribbon is secured in place by the adhesive in channel 18, slit 20 does not need to be sealed for structural reasons. To avoid adhesive seepage about the belt during construction, it is preferable not to attempt to seal sidewalls 21 together and no apparent benefit results from so doing.

One embodiment of an automated belt forming apparatus 100 and the operation thereof to form belt 10 is illustrated in FIGS. 6–14. The portions of the outer length of material 12 passing through the belt former 100 are shown in FIGS. 6–9 as though the belt length were transparent so as to more clearly illustrate the component elements of belt former 100. Belt former 100 comprises a belt guide/drive assembly 102, an adhesive dispensing assembly 104, a slit spreader 106, a reinforcing ribbon feed assembly 108 and a belt clamp 109. The belt drive/guide assembly 102 comprises an electric drive motor (not shown) disposed within the belt former housing 110, a drive gear 112 (see FIG. 11), a pair of driven upper rollers 114 and 116, a pair of driven lower rollers 118 and 120 and a free-wheeling lower belt guide roller 122.

Figure 13:
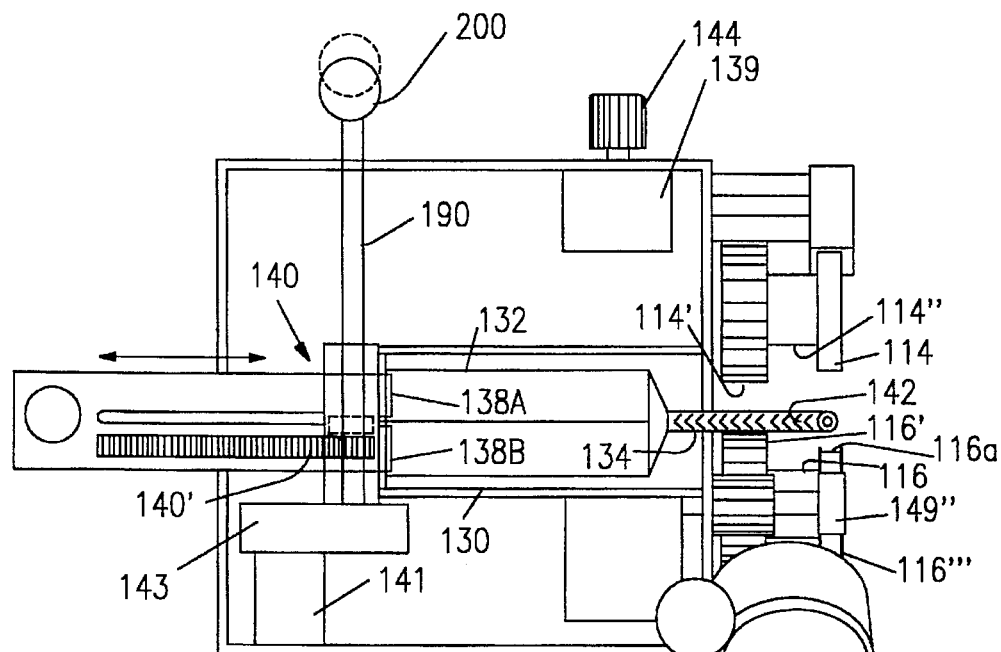
FIG. 13 is a top plan view of a belt forming apparatus employed in the present invention with the cover removed to show the adhesive delivery system employed therein.

As seen in FIG. 13, upper rollers 114 and 116 each comprise an inner gear drive portion 114' and 116', an outwardly projecting cylindrical shoulder 114" and 116", and an outer belt spreader portion 114'" and 116'". The gear drive and shoulder portions of rollers 114 and 116 are formed of steel and are of single piece construction while the outer spreader portions are preferably formed of a Delrin plastic material and held against and in axial alignment with shoulders 114" and 116" by a bolt member 120. In use, the belt spreader portions 114'" and 116'" of upper rollers 114 and 116 project into the length of belt material 12 through slit 20 upon the slit being widened by the slit spreader 106 and temporarily maintain the slit in a spread position as the adhesive 25 and ribbon 14 are fed into channel 18 as will be described. In addition, upper roller 116 also functions as a ribbon feed roller for directing the reinforcing ribbon 14 into the channel 18 in the outer length of belt material 12 and preferably defines a shallow channel 116a in the circumferential surface of spreader portion 116'", as illustrated in FIG. 13, for aligning the ribbon on roller 116 as will also be described later herein.

The lower rollers 118 and 120 are of the same construction as upper rollers 114 and 116 except that the outer portions thereof (not shown) define belt drive portions which bear against the inner surface 16 of the outer length of belt material 12 and drive the belt length through the belt former 100. The outer belt drive portions of rollers 118 and 120 are thus wider than the spreader portions 114'" and 116'" of the upper rollers and are provided with knurled circumferential surfaces to assist in advancing the belt through the belt former. For fabricating typical automotive fan belts having a transverse dimension across the outer surface of about 11/32 to 15/32 inches and wherein the reinforcing ribbon 14 is about 3/16 inches wide, the belt spreader portions of the upper guide rollers are about 0.02 inches wider than the ribbon or about 0.208 inches wide and the belt drive portions of the lower rollers are about 0.50 inches wide. Guide roller 122 over which the outer length of belt material 12 passes prior to reaching the upper and lower guide rollers 114 and 118, defines inner and outer radial side walls, similar to a conventional pulley, which extend about the outer length of belt material for holding the belt material in line as it enters the belt former 100 between upper and lower rollers 114 and 118. A carrying handle 103 is secured to the upper end plate 105 of the housing 110.

In operation, drive gear 112 engages the inner gear drive portions of the lower rollers 118 and 120 and is driven by the drive motor in a clockwise direction so as to cause the lower rollers 118 and 120 to be rotated counterclockwise. The inner gear drive portions of the lower guide rollers also engage the inner drive portions 114' and 116' of the upper guide rollers 114 and 116 to effect clockwise rotation to the upper rollers.

To enable the completed belt 10 formed on belt former 100 to be removed from former 100, the lower rollers 118, 120 and 122 are carried by a support plate 111 pivotally mounted proximate one end thereof about a bolt shaft 113 (See FIG. 13). Pivotal movement of plate 111 and the guide rollers mounted thereon is controlled by a guide rod 115 which is carried by the other end of plate 111 and projects into and is translatable along an arcuate guide slot 117 in the side wall of the belt former housing 110. A handle 119 is welded to guide rod 115 for pivoting plate 111 from its upper operative position illustrated in FIGS. 6–10 to the lower position illustrated in FIG. 11. A vertically disposed spring (not shown) is provided within housing 110 which is operatively secured at its lower end to guide rod 115 for urging the plate 111 to the upper operative position. To lock the plate 111 in the upper position, a spring-loaded rod 121 having a bushing secured in the inner end thereof (not shown) is carried by plate 111 and biased so as to project into a detent or opening (also not shown) in the housing behind plate 111 and below drive gear 112. A radially disposed a handle 123 is secured to rod 121 to retract the rod and disengage the plate 111 from housing 110. To hold the plate 111 in the lower position to facilitate cleaning of the belt former 100, a similar opening 125 is disposed in the lower portion of the belt former housing. To move plate 111 from the upper locked position to the open position, the operator first pulls outwardly on handle 123 which disengages rod 121 from the former housing and then pulls handle 119 downwardly, bringing the lower portion of the belt drive assembly to the position shown in FIG. 11 where it is again locked in place by rod 121. Subsequent retraction of handle 123, will cause the plate and rollers carried thereby to pivot clockwise about bolt shaft 113 under the force of the spring acting thereon and return the plate to the upper position whereupon the bearing in the end of rod 121 will again engage the belt former housing and lock the plate 111 in the operative position.

Figure 15:
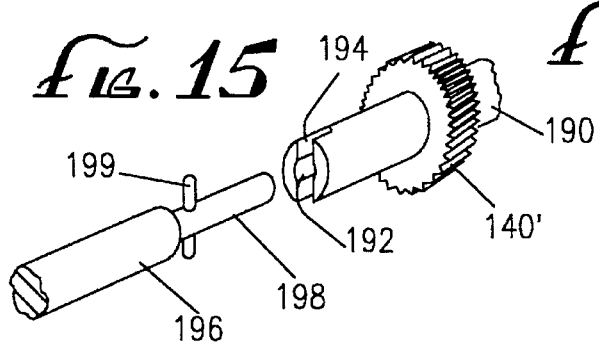
FIG. 15 is a partial exploded view of the connection between the adhesive drive gear motor and the pinion gear in the adhesive feed assembly.
Figure 14:
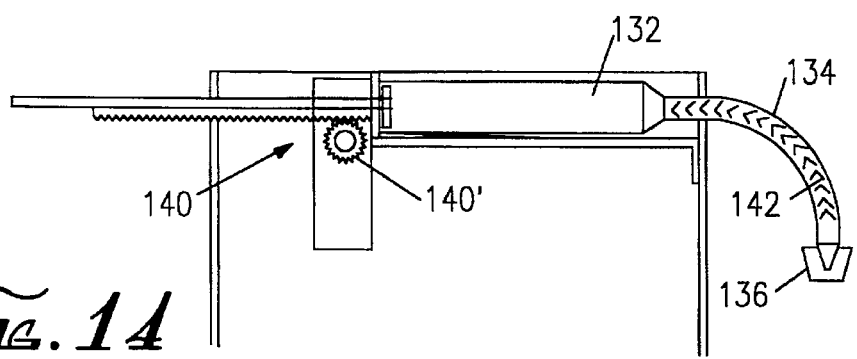
FIG. 14 is a partial side view of a belt forming apparatus employed in the present invention showing the adhesive delivery system.

The adhesive dispensing assembly 104 is shown in FIGS. 13–15 and comprises a horizontally disposed trough 130 mounted in the upper end of the belt former housing 110 for supporting a cartridge 132 of a two component adhesive 25. A feed tube 134 having a tapered nozzle 136 secured to the downstream end thereof is secured to the outlet end of cartridge 132 for directing the adhesive from the cartridge into the channel 18 in the length of belt material 12. A pair of longitudinally movable plungers 138A and 138B are operatively connected by a rack and pinion 140 to a small d.c. gear motor 141 through a planetary gear reduction drive 143 to bear against cartridge 132 and slowly force the adhesive components therefrom. A helix 142 is provided within feed tube 134 to effect mixing of the two adhesive components as they are driven by plungers 138A and 138B through the feed tube. The rate of adhesive feed effected by the linear movement of plungers 138A and 138 can be adjusted by means of a rheostat 139 operatively connected with gear motor 141 and control knob 144 which varies the speed of gear motor 141 and thus the rate of movement of the plungers.

A supply of reinforcing ribbon 14 is carried by a spool 146 rotatably mounted on the belt forming apparatus 100. The ribbon 14 extends from spool 146 through a guide slot 147' in block 147 between the outer belt spreader portion 116' of upper roller 116 and the outer ribbon drive portion 149'" of a ribbon drive roller 149 and about the outer belt spreader portion 116'" of upper roller 116 within the guide channel 116a therein. An arcuate guide 148 is secured to the belt former housing at 150 and extends about a portion of the circumferential surface of roller portion 16'" to direct ribbon 14 about roller 116. Ribbon drive roller 149, like rollers 114–120, is provided with gear and shoulder portions with the inner the gear portion thereof engaging gear portion 116' of roller 116 and is driven by gear portion 116'. A circular knife blade 152 for severing the reinforcing ribbon 14 is operatively connected to a control rod 154 and small drive motor 158. By depressing control rod 154, the knife blade 152 is lowered into the path of the reinforcing ribbon along guide bar 160 and the drive motor 158 is activated, causing rotation of blade 152 and severing of the ribbon 14 from the supply thereof on spool 146. An arcuate plexiglass shield (not shown) is preferably disposed about blade 152 for safety purposes.

To form belt 10 using belt former 100, the outer length of belt material 12 is first cut to the desired length such that the extended ends 12' and 12" define the above-described mating zig-zag surfaces. A guillotine-type knife is preferably employed to make the desired end cuts. The leading end 14' of the reinforcing ribbon projecting from spool 146 is positioned between the outer belt drive portion 116'" of roller 116 and the corresponding portion 149'" of ribbon drive roller 149. The drive motor of the belt former 100 is activated with plate 111 preferably in the lowered position. Upon pulling rod 121 from opening 125, the spring within the belt former housing 110 pulls plate 111 to the upper operative position where rod 121 again locks plate 111 in place and the gear portions of rotating lower rollers 118 and 120 mesh with the gear positions of rollers 114 and 116. The ribbon then begins to be drawn by rollers 116 and 149 about portion 116'" of roller 116 and is held against roller 116 by arcuate guide 148.

Upon activation of the drive motor, the cut length of belt material 12 is inserted into the belt former 100 such that length 12 passes over guide roller 122, the tapered end 106' of the slit spreader blade 106 projects longitudinally into the slit 20 at the leading end 12' of the belt length 12, and is fed forwardly until the leading edge 12' thereof is disposed between the counter-rotating outer belt drive portions 114'" and 118'" of the upper and lower rollers 114 and 118. As the belt length 12 is fed forwardly, the spreader blade 106 opens slit 20, forcing apart side wall portions 21. The inner surface 16 of belt length 12 contacts the outer drive portion of roller 118 and the outer spreader portion 114'" of upper roller 114 is disposed adjacent the leading edge of channel 18. The rotating drive roller 118 then advances the belt length 12 to the start-up position illustrated in FIG. 6 and the drive motor is deactivated. As the belt length 12 is moved to the start-up position, the spreader bar 106 holds the slit 20 in the open position to receive the outer spreader portion 114''' of roller 114 which then projects into channel 18 and in turn holds the slit open to receive the nozzle 136 on the adhesive feeder tube 134 which also projects into channel 18 as seen in FIG. 6. The gear motor 141 is then activated to begin the adhesive feed. The movement of the adhesive from cartridge 132 to nozzle 136 can be accelerated by knob 144 and subsequently adjusted to provide the desired adhesive feed rate. The drive motor remains deactivated after activation of motor 141, stopping the belt travel while the adhesive flows through the feed tube 134 to nozzle 136.

Figure 7:
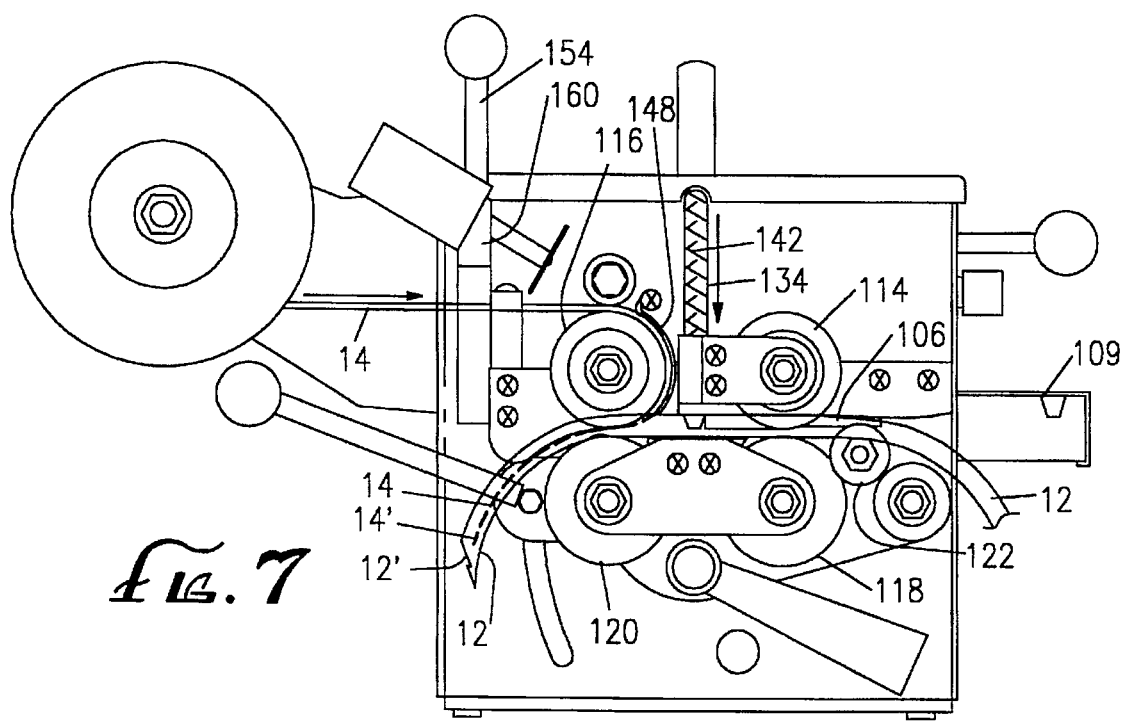

As soon as the adhesive 25 begins flowing into channel 18, the drive motor is again activated and the rotating upper and lower rollers 114–120 cause the belt length 12 again to move from right to left as seen in the drawings with the outer belt drive portions of rollers 118 and 120 abutting the inner surface 16 of the belt length and providing the driving force while the outer belt spreader portions 114''' and 116''' of rollers 114 and 116 extend through slit 20 between the separated side walls 21 thereof to the upper portion of channel 18, temporarily opening slit 20 to receive the adhesive and ribbon and providing surfaces against which the lower drive rollers 118 and 120 can press the belt length 12 to drive the belt length through the belt former 100. Reactivation of the drive motor also causes rollers 116 and 149 to draw the reinforcing ribbon 14 about roller 116 as adhesive 25 is forced into channel 18 through nozzle 136 by the moving plungers 138A and 138B. Roller 116 directs the ribbon into channel 18 in a flat disposition onto the thin layer of adhesive just deposited therein. Typically the leading edge of the reinforcing ribbon is drawn into the channel 18 in belt length 12 about one to one and one-half inches behind the leading end 12' of belt length 12. As the length of belt material 12 continues past the adhesive feed nozzle 134 and roller 116, the adhesive continues to be injected into channel 18 followed by the reinforcing ribbon which is deposited in the adhesive. This stage of the belt forming operation is illustrated in FIG. 7.

Because the outer spreader portions of upper rollers 114 and 116 project through and widen slit 20 to provide access to channel, it is important that they only spread the side walls 21 of slit 20 apart a distance slightly greater than the width of the reinforcing ribbon 14 so as not to stretch the outer length of belt material 12 beyond its elastic limit. By sizing the spreader portions 114''' and 116''' of the upper rollers such that they are only about 0.02 inches wider than the reinforcing ribbon, the inherent resilience in the belt material will quickly close slit 20 over ribbon 14 as the belt length 12 is moved past roller 116, preventing slippage of the ribbon with respect to the belt length 12. In addition, to prevent bunching of ribbon 14 within channel 18, it is important that the ribbon be fed into channel 18 in a taught deposition. Any bunching of the ribbon within the formed belt 10 would create slack in the ribbon within the finished belt 10 and allow the outer length of material 12 to stretch during use which, of course, is undesirable. To avoid such a condition, the diameter of the spreader portion 116''' of roller 116, which also functions as a ribbon feed roller, is made slightly smaller than the diameter of the spreader 114''' of roller 114, reducing the surface speed of roller portion 116''' relative to that of roller portion 14'''. As a result, the rate at which the reinforcing ribbon is drawn into the channel 18 in belt length 12 is reduced slightly relative to the spread at which the belt length 12 is moved so that it is fed into channel 18 in a taught disposition. With the spreader portion of roller 114 defining a diameter of 1.930 inches, a reduction in the diameter of the spreader portion of roller 116 of about 0.050 inches will provide the desired result. By comparison, the drive portions of the lower rollers are 1.970 inches in diameter and the gear portions of rollers 114–120 are each 2.0 inches in diameter and have an equal number of gear teeth.

Figure 8:
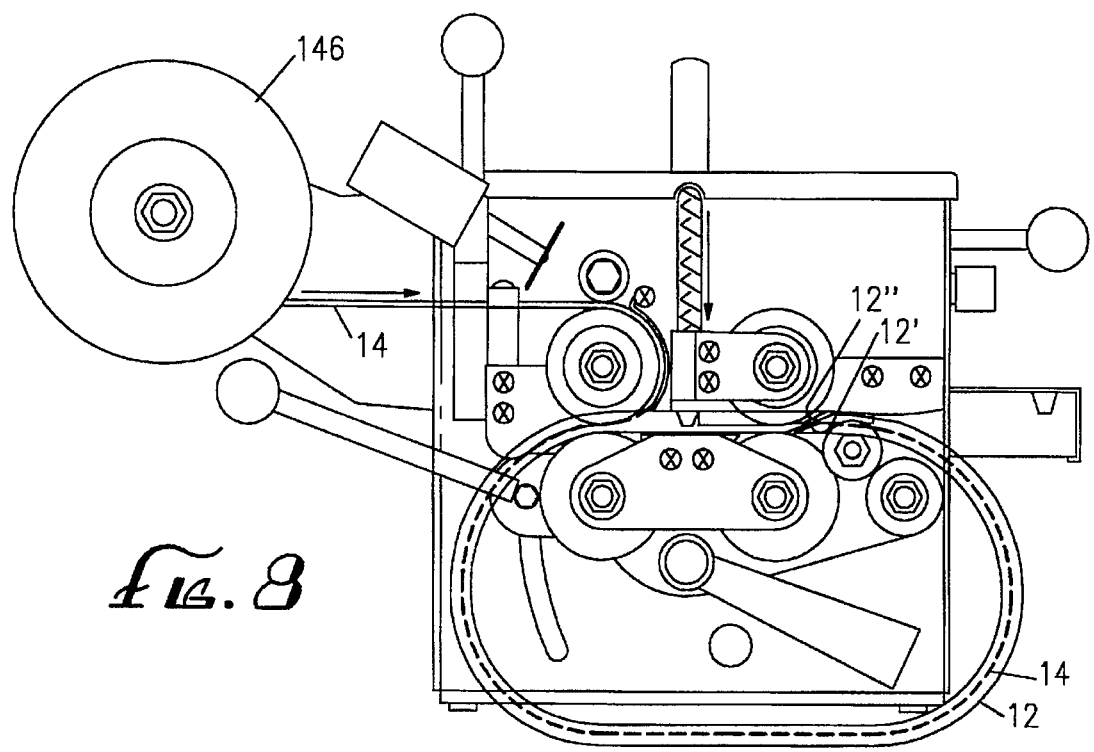
Figure 9:
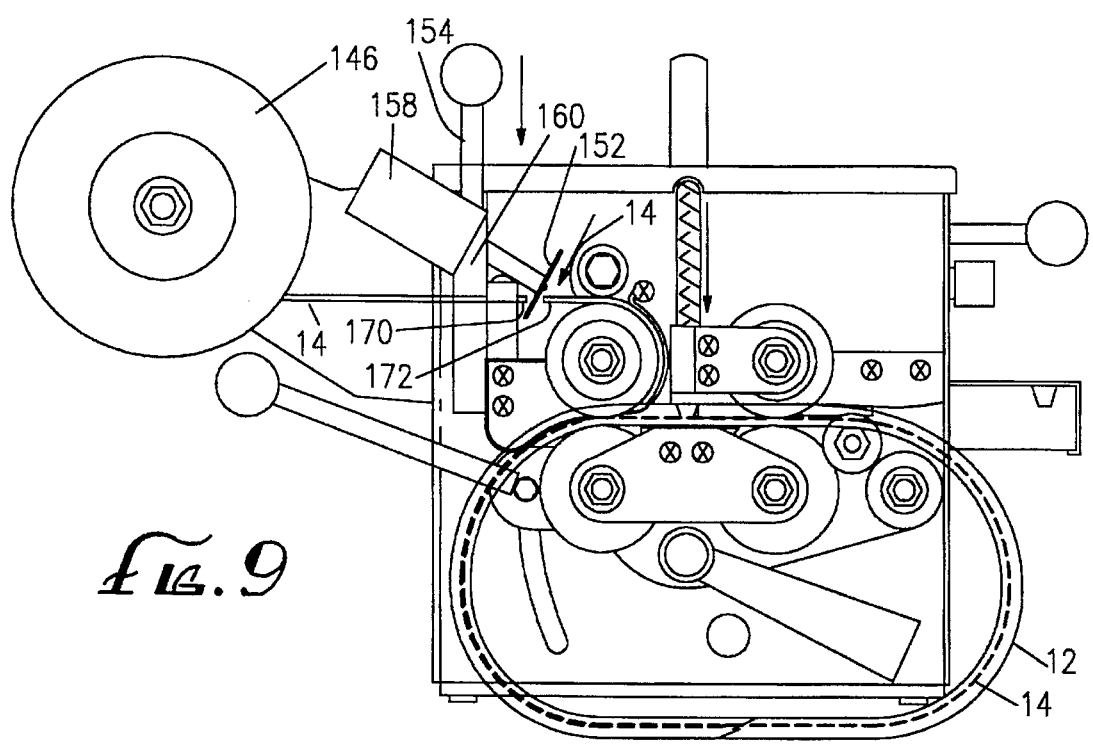
Figure 10:
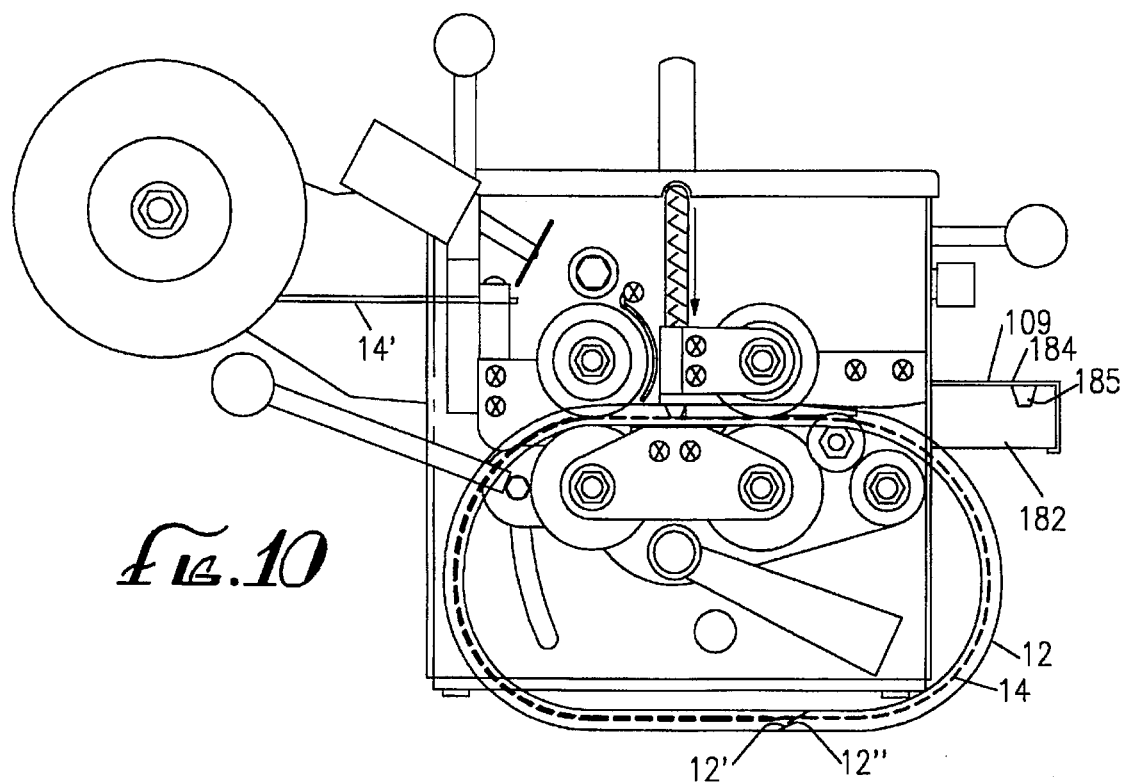

When the trailing edge 12" of belt length 12 approaches upper and lower rollers 114 and 118, the operator takes the leading edge 12' of belt length 12 and positions the leading edge adjacent the trailing edge 12" thereof such that the leading edge is fed back into the belt former 100 between rollers 122, 114 and 118 to form a closed loop. This position is illustrated in FIG. 8. The operator then allows the drive rollers 118 and 120 to continue to move the formed loop of belt material 12 and reinforcing ribbon 14 through the belt former 100. As the adjacently disposed ends 12' and 12" of belt length 12 move past the adhesive feed tube 134 and upper and lower rollers 116 and 120, the reinforcing ribbon is continuously inserted into channel 18, extending across the adjacent ends 12' and 12" of belt length 12 and overlapping itself within channel 18. The drive motor and adhesive gear motor are deactivated when the reinforcing ribbon 14 is disposed in channel 18 in an overlapping disposition for slightly less than one-half of the formed loop. The ribbon knife blade 152 is then activated by control rod 154 severing the reinforcing ribbon at 170 as shown in FIG. 9. The drive motor is again activated to force the trailing end portion 172 of the reinforcing ribbon into channel 18 as illustrated in FIG. 10. The formed belt 10 is then removed from the belt former 100 by pivoting the plate 111 and rollers 122, 118 and 120 carried thereby to the lower position by means of handles 119 and 123 as earlier described and illustrated in FIG. 11. The adjacent ends 12' and 12" of belt length 12 are then manually pulled slightly apart, a small amount of adhesive is applied to the extended ends and the ends are manually fixed in the aligned matting relationship illustrated in FIG. 5.

Figure 11:
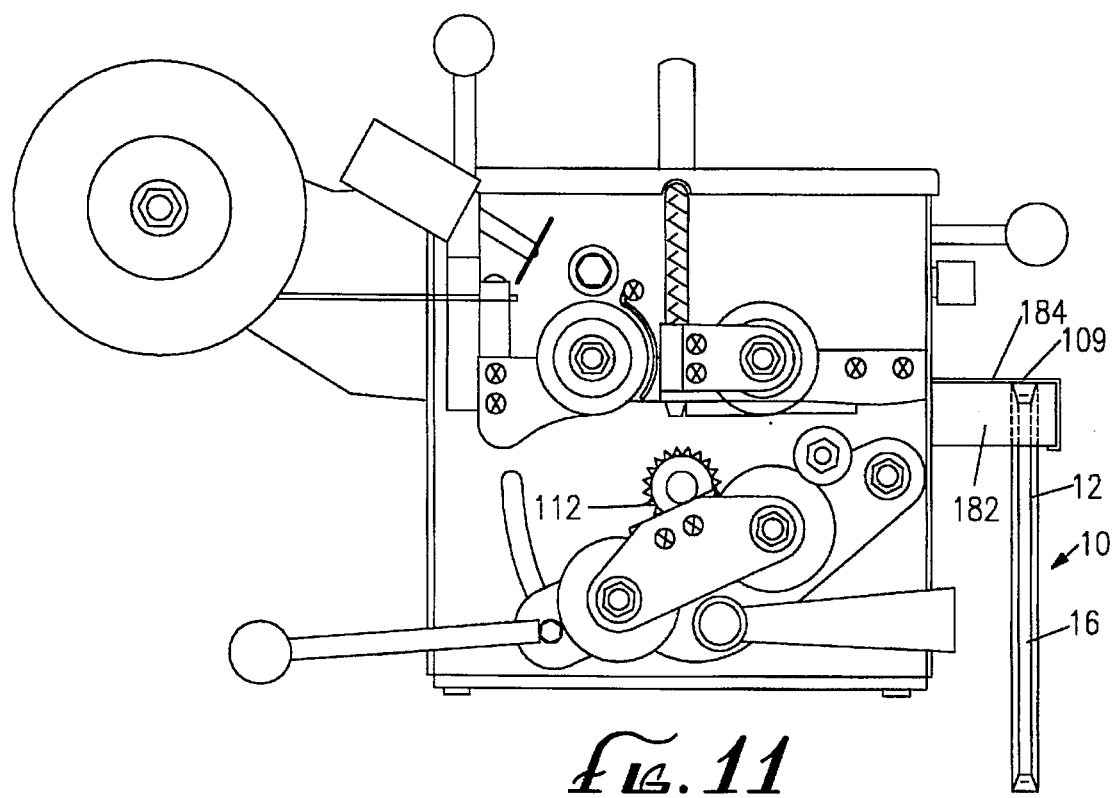
Figure 12:
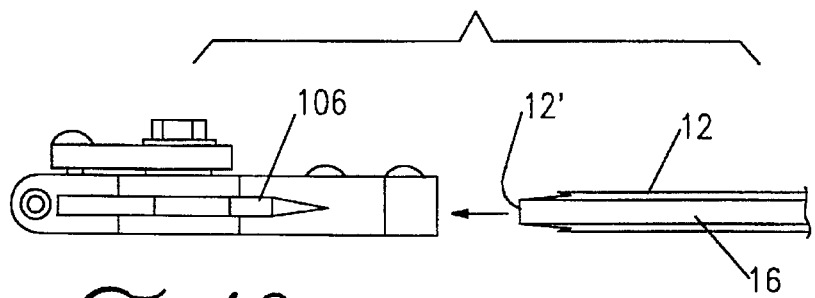
FIG. 12 is a partial bottom plan view of a belt forming apparatus employed in the present invention showing the belt channel spreading device employed therein.

The formed loop is then placed in a clamp to hold ends 12' and 12" together on the adhesive sets. A belt clamp 109 is mounted on the side on the belt forming housing and includes a lower support block 182 and a pivotally mounted top pressing plate 184. Block 182 has a cavity 185 formed therein having the same cross-section configuration as belt 10. By raising pressing plate 184 and inserting the adjacent matting ends 12' and 12" of the formed belt within the cavity 185 in the support block and lowering the plate into the locked position as seen in FIG. 11, the adjacent ends of the belt are firmly held in matting alignment. The belt is allowed to remain within the clamp for about three minutes while the adhesive 25 within the belt cures, completing the formation of belt 10.

To enable the operator to retract plungers 138A and 138B after formation of belt 10, a suitable mechanism is provided for disengaging the rack and pinion 140 as the gear motor 141 would otherwise prevent retraction of the plungers. Such a mechanism is illustrated in FIG. 15. The pinion gear 140' is mounted on a rod 190 provided with a cylindrical axial channel 192 in its extended end portion and a transverse slot 194 extending across the end thereof. The gear motor drive shaft 196 defines a reduced diameter portion 198 adjacent the end thereof which extends into channel 192 in rod 190. A pin 199 extends transversely through and is affixed to the reduced diameter portion of the drive shaft. Pin 199 projects radially through slot 194 and thus forms an interlock between the drive shaft 196 and rod 190 on which the pinion gear 140' is affixed. Rotation of the gear motor drive shaft is thus imparted to rod 190 and pinion gear 140' by this interlock. When the gear motor is not activated, retraction of rod 190 by means of gripping knob 200 causes the pinion gear to be pulled from the rack and the slotted end of rod 140 from pin 199, whereupon the plungers can be easily retracted for removal of the adhesive cartridge.

It is to be understood that the various components of the belt forming apparatus 100 could be modified and other apparatus developed for forming belt 10 of the present invention in an automated or semi-automated manner. For example, a single upper roller could be employed for spreading the slit 20 and feeding the reinforcing ribbon 14 into reinforcing ribbon 14 into channel 18. The adhesive feed nozzle would then deposit the adhesive over the reinforcing ribbon within channel 18. In addition, it is believed that a structurally sound belt 10 could be formed if the adhesive were only fed into channel 18 while the reinforcing ribbon was being overlapped upon itself within the channel.

Belt 10 can also be formed manually. For example, the outer length of material could be provided to the person forming belt 10 on spools, in coils or in finite lengths with the reinforcing ribbon 14 already disposed within the interior channel 18. To form belt 10, one first simply severs a length of belt material with the ribbon disposed therein from the supply thereof such that the severed length is approximately fifty percent longer than needed to form the desired edge of endless belt. One end of the severed length of material is then cut at an acute angle, leaving an end of the interiorly disposed reinforcing ribbon flush therewith. A portion of the reinforcing ribbon proximate the other end thereof is then pulled outwardly from the channel in the outer length of belt material 12 through slit 20 so that the withdrawn portion of ribbon projects from the severed length of belt material intermediary of its ends. Over fifty percent of the reinforcing ribbon should be so removed from the length of belt material 12 so as to allow the severed outer length of belt material then to be cut to the exact length to form the endless belt at a location from which the ribbon has been removed while leaving a sufficient amount of reinforcing ribbon projecting from the sized length of belt material to extend about one and one-half times around the formed belt.

After the appropriate amount of reinforcing ribbon is pulled from the outer length of material, the end portion of the outer length of material from which the reinforcing ribbon was removed is then severed as described to provide the desired length belt material for the particular belt size and to provide the sized length with mating inclined ends. The protruding portion of reinforcing ribbon extending through slit 20 is then coated with adhesive and as the belt is formed into a closed loop about a pair of pulleys or other circular guides. As the belt is being formed into a loop, the protruding reinforcing ribbon coated with adhesive is pulled about the loop and drawn back into channel 18 through slit 20, across the mating and abutting ends of the outer length of material and about itself such that approximately one-half the reinforcing ribbon is disposed in an overlapping relationship within channel 18. Again, a small amount of adhesive is preferably applied to the severed ends of the belt material and upon setting of the adhesive, the desired endless belt is formed in the desired length.

While the use of an automated belt forming apparatus such as belt former 100 is preferred for fabricating belt 10, the above-described method could prove useful in emergency situations or in other instances where an automated forming apparatus was not available. The above-described method could be employed using a solely hand held tool having a knife blade and a wedge-shaped slit spreader affixed proximate rotatable wheel for rolling the ribbon into channel 18 similar to the manner in which the belt spreader portion 116''' of roller 116 rolls the ribbon into channel 18 while holding the side walls 21 of slit 20 apart.

FIG. 4 illustrates a variation of the present invention wherein the outer length of belt material 250 is formed by extrusion with a plurality of reinforcing cords 252 extending longitudinally therethrough for unusual applications requiring an exceptionally strong belt. Cords 252 could be of the same material as reinforcing ribbon 14. Various other changes and modifications may be made in carrying out the present invention without departing from the spirit and scope thereof. Insofar as these changes and modifications are within the purview of the appended claims, they are to be considered as part of the present invention.

I claim:

1. An endless belt for use in power transmission comprising an outer length of flexible tear-resistant material having abutting extended ends and forming a closed loop, said length of material defining an outer surface, an inner surface substantially parallel to said outer surface and an endless channel extending longitudinally therethrough, a ribbon of a flexible tear-resistant material disposed within said channel and extending about said loop defined by said outer length of material, said ribbon defining first and second portions, said second portion extending across said abutting ends of said outer length of material and overlapping said first portion of said ribbon within said channel, and an adhesive disposed within said channel securing said second portion of said ribbon to said first portion thereof so as to maintain said outer length of material in said closed loop.

2. An endless belt for use in power transmission comprising an outer length of flexible tear-resistant material having mating extended ends and forming a closed loop, said length of material defining an outer surface, an inner surface substantially parallel to said outer surface, an endless channel extending longitudinally therethrough, and a slit extending the length of said channel between said channel and said outer surface, a substantially flat ribbon of flexible tear-resistant material disposed within said channel and extending about said loop defined by said outer length of material, said ribbon defining first and second portions, said second portion extending across said mating ends of said outer length of material and overlapping said first portion of said ribbon within said channel, and an adhesive disposed within said channel securing said ribbon to said outer length of material and second portion of said ribbon to said first portion thereof so as to maintain said outer length of material in said closed loop.

3. The belt of claim 2 wherein said second portion of said ribbon overlaps said first portion thereof within said channel for a distance equal to about one-quarter to one-half the circumferential dimension of said endless belt.

4. A belt assembly for forming an endless belt of a desired size for use in power transmission, said assembly comprising: an outer length of flexible tear-resistant material defining an outer surface, an inner surface substantially parallel to said outer surface, a first end, a second end, an interior channel extending longitudinally therethrough and being spaced distance from said inner surface, and a slit extending the length thereof from said outer surface to said channel; and a reinforcing ribbon of a flexible tear-resistant material disposed within and along said channel, one end of said ribbon being proximate said first end of said outer length of tear resistant material and a second end of said ribbon being proximate said second end of said outer length of material, a portion of said ribbon adjacent said second end thereof being adopted to be pulled from said outer length of tear-resistant material through said slit therein intermediary of the ends of said outer length of material such that upon cutting said outer length of material to a desired length having mating ends, applying an adhesive to said portion of said ribbon pulled from said outer length of material, placing said mating ends of said outer length of material in an abutting relationship and drawing said portion of said ribbon about said outer length of material and into said channel through said slit such that said portion of said ribbon overlaps said first end of said ribbon and a second portion thereof and is secured thereto by said adhesive, a continuous belt of substantially uniform construction is defined.

5. A belt assembly for forming an endless belt of a desired size for use in power transmission, said assembly comprising: an outer length of flexible tear-resistant material defining an outer surface, an inner surface substantially parallel to said outer surface, a first end, a second end, an interior channel extending longitudinally therethrough, and a slit extending the length thereof from said outer surface to said channel; an adhesive adapted to be injected through said slit into said channel throughout the length thereof; and a reinforcing ribbon of flexible tear-resistant material adapted to be inserted into said channel through said slit such that upon injecting said adhesive into and along said channel, placing said ends of said outer length of material in an abutting relationship and drawing said ribbon about said outer length of material and into said channel through said slit so that one end of said ribbon is disposed proximate said first end of said outer length of material and said ribbon extends in a flat disposition within said channel about said outer length of material, across the abutting ends thereof, overlapping said first end of said ribbon and a portion thereof, the overlapping portions of said ribbon are secured together by said adhesive defining a continuous belt of substantially uniform construction.

6. An apparatus for forming a reinforced endless belt of a desired size for use in power transmission from a finite length of belt material having an interior channel extending longitudinally therethrough and a slit extending between an outer surface of the belt material and the interior channel, a supply of reinforcing ribbon and an adhesive, said apparatus comprising: a drive assembly for moving the length of belt material through said apparatus; a generally V-shaped spreader for widening the slit in the length of the belt material as the drive assembly moves the material thereby; a dispenser for continuously and selectively injecting the adhesive into the channel in the length of belt material through the widened slit therein as the drive assembly moves the material thereby; an arm for holding a supply for reinforcing ribbon; a guide for directing reinforcing ribbon from the holding arm into the channel in the length of belt material through the widened slit therein in a flat disposition in contact with the adhesive in the channel as the drive assembly moves the length of belt material by the guide such that a leading edge of the ribbon is disposed proximate a leading edge of the length of belt material and the ribbon extends in a flat disposition throughout the length of the channel and, upon bringing the leading end of the length of belt material into abutment with the other end thereof so as to form a closed loop, said guide and said drive assembly cooperate to cause the ribbon to extend across the abutting ends of said length of belt material and controllably overlap a desired length of the reinforcing ribbon previously disposed in the channel by said ribbon guide whereby upon deactivating the drive assembly, severing the reinforcing ribbon between said holding arm and said ribbon guide and reactivating said drive assembly, the trailing end of said ribbon is disposed in a flat disposition within the channel and upon removing the form closed loop of belt material and reinforcing ribbon from said apparatus and holding said ends of belt material in an abutting relationship as said adhesive sets, a continuous belt of substantially uniform construction is formed.

\* \* \* \* \*